(12) United States Patent
Kim (10) Patent No.: US 9,077,453 B2
(45) Date of Patent: Jul. 7, 2015

(54) MULTI-CHANNEL PHOTORECEIVER MODULE

(71) Applicant: Electronics and Telecommunications Research Institute, Daejeon (KR)

(72) Inventor: Jong-Hoi Kim, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 203 days.

(21) Appl. No.: 13/839,013

(22) Filed: Mar. 15, 2013

(65) Prior Publication Data
US 2014/0147131 A1    May 29, 2014

(30) Foreign Application Priority Data

Nov. 28, 2012   (KR) .................. 10-2012-0136140

(51) Int. Cl.
| | |
|---|---|
| H04B 10/60 | (2013.01) |
| H04B 10/61 | (2013.01) |
| G02B 6/28 | (2006.01) |
| G02B 6/12 | (2006.01) |
| G02B 6/125 | (2006.01) |

(52) U.S. Cl.
CPC ............ H04B 10/61 (2013.01); *G02B 6/12004* (2013.01); *G02B 6/12007* (2013.01); *G02B 6/125* (2013.01); G02B 6/2813 (2013.01)

(58) Field of Classification Search
CPC ...... H04B 10/60; H04B 10/61; H04B 10/611; H04B 10/612; H04B 10/613; H04B 10/614; H04B 10/615; H04B 10/63; H04B 10/64
See application file for complete search history.

(56) References Cited

U.S. PATENT DOCUMENTS

| | | | |
|---|---|---|---|
| 6,094,285 A * | 7/2000 | Wickham et al. ................. 398/1 |
| 2004/0114939 A1* | 6/2004 | Taylor ............................ 398/152 |
| 2006/0039705 A1* | 2/2006 | Goodwill et al. ............. 398/164 |
| 2007/0133918 A1* | 6/2007 | Cho et al. ........................... 385/1 |
| 2009/0129788 A1* | 5/2009 | Seimetz ........................ 398/208 |
| 2011/0064354 A1 | 3/2011 | Nishio et al. |
| 2011/0110622 A1 | 5/2011 | Akutsu et al. |

FOREIGN PATENT DOCUMENTS

| KR | 10-2003-0081294 A | 10/2003 |
|---|---|---|
| KR | 10-2008-0029911 A | 4/2008 |

* cited by examiner

*Primary Examiner* — Darren E Wolf
(74) *Attorney, Agent, or Firm* — Rabin & Berdo, P.C.

(57) ABSTRACT

Provide an optical receiver module. The optical receiver module includes: an optical fiber array including a first optical fiber that delivers an optical signal and a second optical fiber that delivers a reference optical signal; a plate optical integrated circuit including first and second multi mode interference (MMI) optical isolators respectively receiving the optical signal and the reference optical signal through a plurality of first optical waveguides; and an optical detector array receiving two optical signals from each of the first and second MMI optical isolators through a plurality of second optical waveguides, wherein the optical detector array includes a plurality of third optical waveguides aligned to be connected to the other end of each of the plurality of second optical waveguides in one-to-one correspondence.

11 Claims, 6 Drawing Sheets

MULTI-CHANNEL PHOTORECEIVER MODULE

CROSS-REFERENCE TO RELATED APPLICATIONS

This U.S. non-provisional patent application claims priority under 35 U.S.C. §119 of Korean Patent Application No. 10-2012-0136140, filed on Nov. 28, 2012, the entire contents of which are hereby incorporated by reference.

BACKGROUND OF THE INVENTION

The present invention disclosed herein relates to an optical communication system and more particularly, to an optical receiver module combining a plate optical integrated circuit and an optical detector array by using an optical arrangement waveguide.

Recently, data such as audio and video signals transmitted via internet are being increased. Accordingly, communication systems using electrical signals are being replaced by optical communication systems that transmit/receive large amounts of data by using optical signals. The optical communication systems transmit light by using optical fibers as transmission media and typically transmit laser beams via optical fiber cables for communication.

Optical communication is made in a way that converts information from an electrical signal form into a light energy form and transmits it and then restores the converted light energy form into an electrical signal form. As a medium for optical communication, an optical transmitter, an optical transmission medium, and an optical receiver are required.

Especially, as a method of manufacturing an optical receiver, provided is a hybrid integrated method in which after an optical detector chip is attached on a silicon substrate, it is bonded to a section of a plate optical integrated circuit. However, a bonding process for an optical detector and a plate optical integrated circuit substrate includes complex manufacturing processes, and fine misalignment occurs due to a thermal expansion coefficient difference between media.

SUMMARY OF THE INVENTION

The present invention provides an optical receiver module having a simple structure and no misalignment during a bonding process between an optical detector chip and a plate optical integrated circuit.

Embodiments of the present invention provide an optical receiver module including: an optical fiber array including a first optical fiber that delivers an optical signal and a second optical fiber that delivers a reference optical signal; a plate optical integrated circuit including first and second multi mode interference (MMI) optical isolators respectively receiving the optical signal and the reference optical signal through a plurality of first optical waveguides; and an optical detector array receiving two optical signals from each of the first and second MMI optical isolators through a plurality of second optical waveguides, wherein the optical detector array includes a plurality of third optical waveguides aligned to be connected to the other end of each of the plurality of second optical waveguides in one-to-one correspondence.

One end of each of the plurality of first optical waveguides may be connected to the first and second optical fibers and the other end of each of the plurality of first optical waveguides may be divided into two optical waveguides to be connected to the first and second MMI optical isolators, respectively.

The optical fiber array and the plate optical integrated circuit may be formed on a first substrate; the optical detector array may be formed on a second substrate; and the first substrate and the second substrate may be formed of the same medium.

The optical fiber array and the plate optical integrated circuit may be disposed on the first substrate, and the optical detector array may be disposed on the second substrate.

The plurality of third optical waveguides may include a plurality of output waveguides and a plurality of optical alignment waveguides.

The optical receiver module may further include a plurality of first optical detectors connected to the other ends of the plurality of output waveguides, respectively.

Each of the first and second MMI optical isolators may allow the received optical signal and reference signal to interfere with each other.

The two optical signals supplied from the first and second MMI optical isolators may have the same power, and may be outputted through one end of each of the plurality of second optical waveguides.

The other end of each of the plurality of second optical waveguides may be divided into first and second output terminals, and the first and second output terminals may be connected to one output waveguide and one optical alignment waveguide, respectively.

The plurality of third optical waveguides may include first and second optical alignment waveguides for aligning the plate optical integrated circuit and the optical detector array; and the first and second optical alignment waveguides may be respectively disposed at the uppermost and the lowermost of the plurality of third waveguides.

The optical receiver module may further include a third substrate including third and fourth optical fibers connected to the first and second optical alignment waveguides, respectively, wherein optical signal outputted from the third and fourth optical fibers may be measured by using first and second optical detectors.

A section of the second substrate may be bonded to a section of the first substrate; a section of the third substrate may be bonded to a section of the second substrate; and the first to third substrates may be aligned by using the intensity of the optical signal measured by the second and second detectors.

The plate optical integrated circuit and the optical detector array may be formed on a silica or Si substrate.

In still other embodiments of the present invention, an optical receiver module includes: a first optical waveguide part connected to a first optical fiber and divided into first and second optical waveguides; a second optical waveguide part connected to a second optical fiber and divided into third and fourth optical waveguides; a first MMI optical isolator receiving an optical signal delivered through the first and third optical waveguides and, isolating the received optical signal into two optical signals having the same power through an optical signal interference; a second MMI optical isolator receiving an optical signal delivered through the second and fourth optical waveguides and isolating the received optical signal into two optical signals having the same power through a optical signal interference; a third optical waveguide part connected to the first MMI optical isolator and divided into fifth and sixth optical waveguides, each of the fifth and sixth optical waveguides being divided into two optical waveguides; a fourth optical waveguide part connected to the second MMI optical isolator and divided into seventh and eighth optical waveguides, each of the seventh and eighth waveguides being divided into two optical waveguides; and an optical detector array connected to output terminals of the third and fourth optical waveguide parts in one-to-one correspondence.

The optical detector array may include a plurality of optical waveguides connected to output terminals of the third and fourth optical waveguide parts in one-to-one correspondence; and optical waveguides at the uppermost and the lowermost of the plurality of optical waveguides may be used for aligning the optical detector array and the first to fourth optical waveguide parts.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Hereinafter, it will be described about an exemplary embodiment of the present invention in conjunction with the accompanying drawings.

Figure 1:
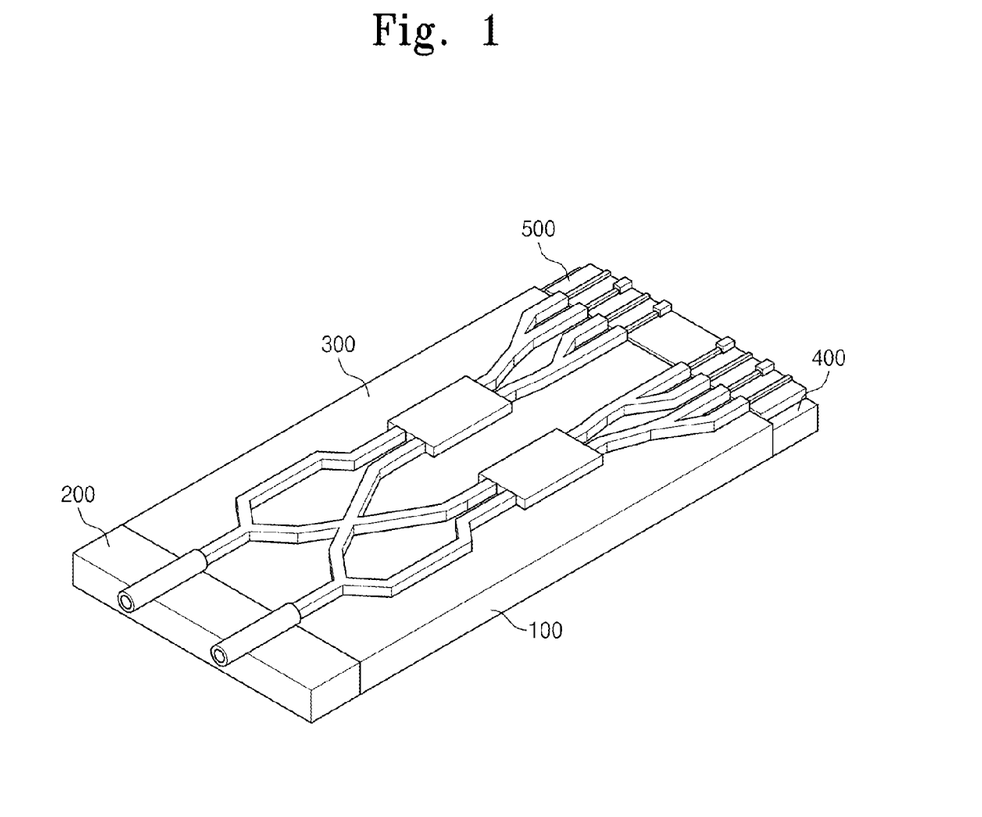
FIG. 1 is a view illustrating an optical receiver module according to an embodiment of the present invention.

FIG. 1 is a view illustrating an optical receiver module according to an embodiment of the present invention. Referring to FIG. 1, the optical receiver module includes an optical fiber array 200 and a plate optical integrated circuit 300 on a first substrate 100, and an optical detector array 500 on a second substrate 400.

The optical fiber array 200 and the plate optical integrated circuit 300 are placed on the first substrate 100 and then manufactured. That is, the optical fiber array 200 and the plate optical integrated circuit 300 may be manufactured on the same substrate through a hybrid integrated method.

The optical fiber array 200 includes a plurality of optical fibers delivering optical signals. The plurality of optical fibers respectively transmit an optical signal input from the outside and a reference optical signal to a plurality of first optical waveguides in the plate optical integrated circuit 300.

The plate optical integrated circuit 300 includes a plurality of first optical waveguides receiving an optical signal from the optical fiber array 200 and a reference optical signal. Also, the plate optical integrated circuit 300 may include a plurality of multi mode interference (MMI) optical isolators for allowing an optical signal and a reference optical signal to interfere with each other, all of which are delivered through a plurality of first optical waveguides. Moreover, the plate optical integrated circuit 300 includes a plurality of second optical waveguides delivering an optical signal output from a plurality of MMI optical isolator.

The second substrate 400 is manufactured of the same material as the first substrate 100 supporting the optical fiber array 200 and the plate optical integrated circuit 300. Also, the optical detector array 500 is disposed on the second substrate 400. The optical detector array 500 includes a plurality of output waveguides for detecting optical signals delivered from a plurality of second optical waveguides in the plate optical integrated circuit 300 and a plurality of optical alignment waveguides for optical alignment.

Moreover, by using the plurality of optical alignment waveguides, a process for bonding the plate optical integrated circuit 300 and the optical detector array 500 of the optical receiver module may become simpler, and their accurate alignments may be obtained.

In this manner, the plate optical integrated circuit 300 is aligned with the optical detector array 500 by using the plurality of optical alignment waveguides. Accordingly, without performing polishing and etching processes on the optical waveguide in the plate optical integrated circuit, the optical receiver module may be simply manufactured. Furthermore, since the first substrate 100 and the second substrate 400 are made of the same material, misalignment due to a thermal expansion coefficient difference between media may be prevented.

Figure 2:
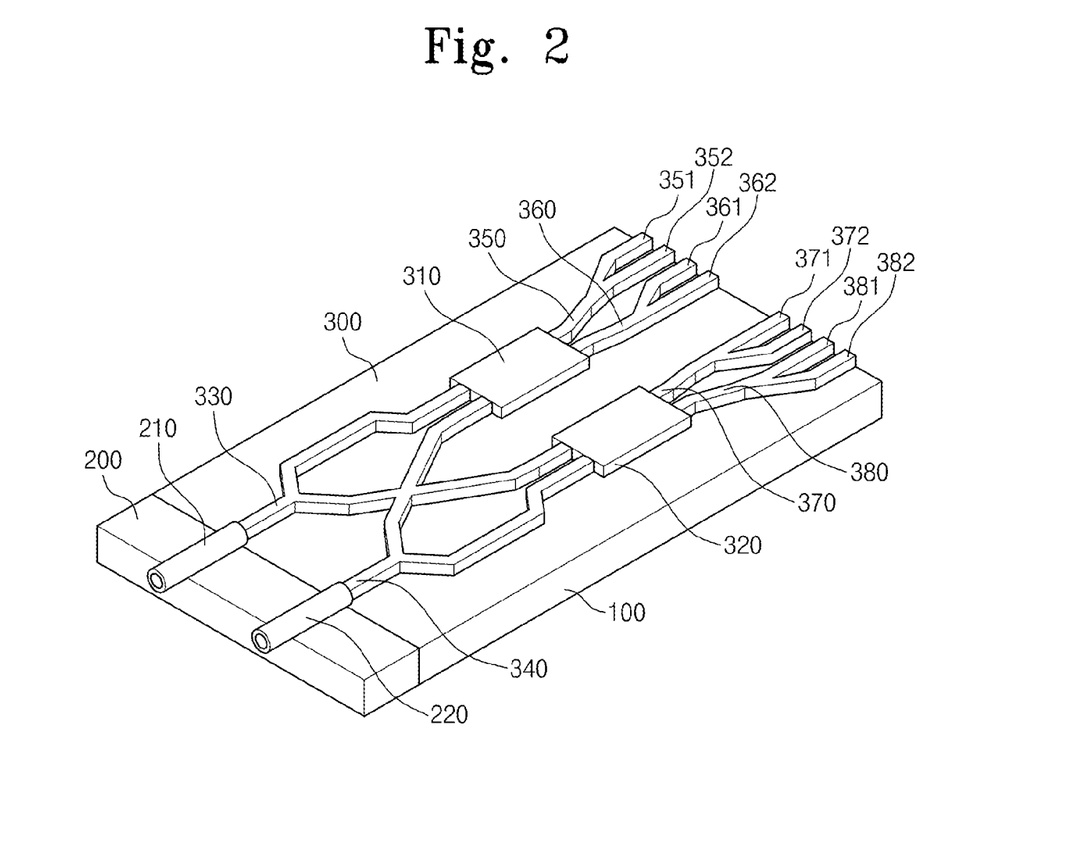
FIG. 2 is a view illustrating a first substrate of an optical receiver module according to an embodiment of the present invention.

FIG. 2 is a view illustrating a first substrate of an optical receiver module according to an embodiment of the present invention. The first substrate 100 of FIG. 2 includes at least an optical fiber, an optical waveguide, and an MMI optical isolator, which are used for alignment of the optical receiver module. However, the present invention is not limited thereto, and thus, the first substrate 100 may further include additional optical fibers, optical waveguides, and MMI optical isolators.

Referring to FIG. 2, the first substrate 100 includes first and second optical fibers 210 and 220, first and second MMI optical isolators 310 and 320, and first to sixth optical waveguides 330, 340, 350, 360, 370, and 380.

The first optical fiber 210 delivers optical signals from the outside to the first optical waveguide 330. The first optical waveguide 330 is connected to the first optical fiber 210 and is separated into two output optical waveguides. The two output optical waveguides separated from the first optical waveguide 330 are connected to the first and second MMI optical isolators 310 and 320, respectively. Accordingly, the first optical waveguide 330 may deliver optical signals from the first optical fiber 210 to the first and second MMI optical isolators 310 and 320.

In the same manner, the second optical fiber 220 delivers a reference optical signal from the outside to the second optical waveguide 340. The second optical waveguide 340 is connected to the second optical fiber 220, and is separated into two output optical waveguides. The two output optical waveguides separated from the second optical waveguide 340 are connected to the first and second MMI optical isolators 310 and 320, respectively. Accordingly, the second optical waveguide 340 may deliver a reference optical signal from the second optical fiber 220 to the first and second MMI optical isolators 310 and 320. Herein, the reference optical signal, as a reference signal interfering with an optical signal in the first and second MMI optical isolators 310 and 320, may be a local oscillation signal.

The first and second MMI optical isolators 310 and 320 receive an optical signal and a reference signal from the first and second optical waveguide parts 330 and 340, respectively. Then, each of the first and second MMI optical isolators 310 and 320 allows the received optical signal and reference optical signal to interfere with each other. The first MMI optical isolator 310 generates two optical signals having the same power through an interference of the received optical signal and reference optical signal, and then, delivers the generated two optical signals to the third and fourth optical waveguide parts 350 and 360, respectively. In the same manner, the second MMI optical isolator 310 generates two optical signals having the same power through an interference of the received optical signal and reference optical signal, and then, delivers the generated two optical signals to the fifth and sixth optical waveguide parts 370 and 380, respectively.

Each of the third and fifth optical waveguide parts 350 and 360 is connected to the first MMI optical isolator 310 and is divided into two optical waveguides. The third optical waveguide part 350 is divided into first and second optical waveguides 351 and 352, and the fourth optical waveguide part 360 is divided into third and fourth optical waveguides 361 and 362. Similarly, each of the fifth and sixth optical waveguides parts 370 and 380 is connected to the second MMI optical isolator 320 and is divided into two optical waveguides. The fifth optical waveguide part 370 is divided into fifth and sixth optical waveguides 371 and 372, and the sixth optical waveguide part 380 is divided into seventh and eighth optical waveguides 381 and 382.

The two optical waveguides divided from each of the third to sixth optical waveguide parts 350, 360, 370, and 380 include an optical alignment waveguide and an optical output waveguide, respectively. In more detail, the two optical waveguides include an optical alignment waveguide for aligning the plate optical integrated circuit 300 and the optical detector array 500 and an optical output waveguide for detecting an optical signal. Additionally, the first to eighth optical waveguides divided from the third to sixth optical waveguide parts 350, 360, 370, and 380 are connected to a plurality of optical waveguides of the optical detector array 500 in one-to-one correspondence.

First, the first optical waveguide, the third optical waveguide 361, the sixth optical waveguide 372, and the eighth optical waveguide 382 serve as an optical alignment waveguide. Especially, the first and eighth optical waveguide 351 and 382 are used for align the first substrate 100 and the second substrate 400. Also, the third and sixth optical waveguides 361 and 372 allows the intensity percentage of optical signals outputted from the output terminals of the fourth and fifth optical waveguide parts 360 and 370 to be uniform with respect to the intensity percentage of optical signals outputted from the output terminals of the third and sixth optical waveguide parts 350 and 380.

For example, it will be assumed that the intensity percentage of an optical signal outputted from the first optical waveguide 351 of the third optical waveguide part 350 is 70% and the intensity percentage of an optical signal outputted from the second optical waveguide 352 is 30%. Accordingly, in order to make the intensity percentage of an optical signal between each optical waveguide part uniform, the intensity percentage of an optical signal outputted from the third optical waveguide 351 is manufactured to be set to 70% in correspondence to the intensity percentage of an optical signal outputted from the first optical waveguide 351.

The second optical waveguide 352, the fourth optical waveguide 362, the fifth optical waveguide 371 and the seventh optical waveguide 381 are connected to the optical detection waveguides in the optical detector array 500 in one-to-one correspondence in order to deliver optical signals.

Similarly, the plate optical integrated circuit 300 includes the first and eighth optical alignment waveguides 351 and 382. Also, by using the first and eighth optical alignment waveguides 351 and 382, the plate optical integrated circuit 300 does not require etching and polishing processes for optical alignment. Accordingly, a simpler and more accurate bonding process for the first substrate 100 and the second substrate 400 may be performed.

Figure 3:
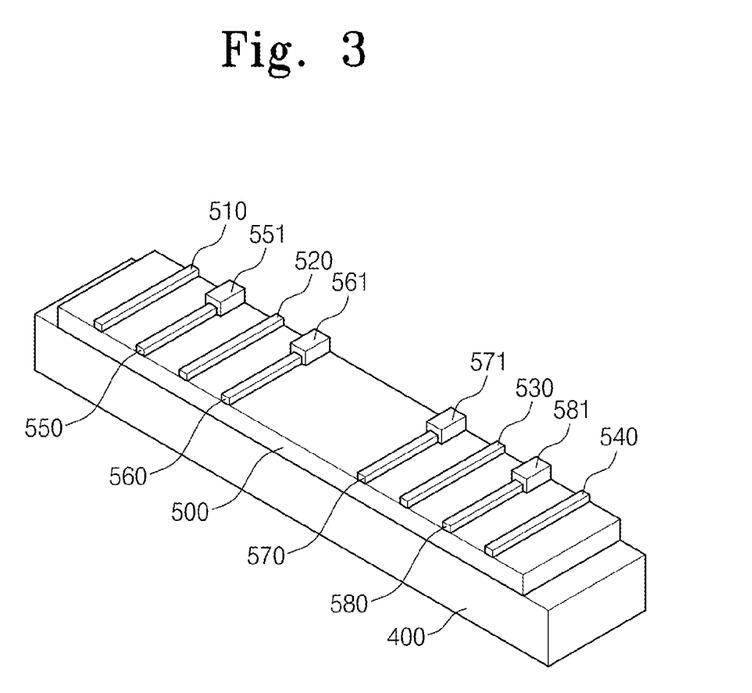
FIG. 3 is a view illustrating a second substrate of an optical receiver module according to an embodiment of the present invention.

FIG. 3 is a view illustrating a second substrate of an optical receiver module according to an embodiment of the present invention. Referring to FIG. 3, the second substrate 400 includes an optical detector array 500. The optical detector array 500 is disposed on the second substrate 400, and includes first to fourth optical alignment waveguides 510, 520, 530, and 540, and first to fourth optical detection waveguides 550, 560, 570, and 580.

First to fourth optical detectors 551, 561, 571, and 581 for detecting optical signals are respectively connected to the other ends of the first to fourth optical detection waveguides 550, 560, 570, and 580. The first to fourth optical detectors 551, 561, 571, and 581 receive optical signals through the first to fourth optical detection waveguides 550, 560, 570, and 580. Then, each of the first to fourth optical detectors 551, 561, 571, and 581 converts the received optical signal into an electrical signal. Accordingly, it shows that the optical receiver module receives an optical signal from the outside. Additionally, the first to fourth optical detection waveguides 550, 560, 570, and 580 are connected to a second optical waveguide 352, a fourth optical waveguide 362, a fifth optical waveguide 371, and a seventh optical waveguide 381 of the plate optical integrated circuit 300 in one-to-one correspondence.

The first to fourth optical alignment waveguides 510, 520, 530, and 540 are connected to a first optical waveguide 351, a third optical waveguide 361, a sixth optical waveguide 372, and an eighth optical waveguide 382 of the plate optical integrated circuit 300 of FIG. 2 in one-to-one correspondence.

Especially, the first and eighth optical waveguide 351 and 382 are respectively provided at the uppermost and the lowermost of the first to eighth optical waveguides of the plate optical integrated circuit 300. Also, the first and fourth optical alignment waveguides 510 and 540 are provided at the uppermost and the lowermost of the optical waveguides of the optical detector array 500. Moreover, the first and eighth optical waveguides 351 and 382 are connected to the first and fourth optical alignment waveguides 510 and 540 in one-to-one correspondence in order to align the plate optical integrated circuit 300 and the optical detector array 500.

That is, by using the intensity of an optical signal delivered through the first optical alignment waveguide 510 connected to the first optical waveguide 351 and the fourth optical alignment waveguide 540 connected to the eighth optical waveguide 382, an alignment between two chips may be made. Here, the intensity of an optical signal delivered through the first and fourth optical alignment waveguides 510 and 540 may be measured by using an external optical detector. By measuring the intensity of an optical signal with such an external optical detector, an alignment between the plate optical integrated circuit 300 and the optical detector array 500 may be made. Additionally, since the first substrate 100 and the second substrate 400 are formed of the same material, misalignment due to a thermal expansion coefficient difference between media may be prevented.

Similarly, the optical detector array 500 is disposed on the second substrate 400, and includes first to fourth optical alignment waveguides 510, 520, 530, and 540 for optical alignment and first to fourth optical detection waveguides 550, 560, 570, and 580 for optical signal detection. Also, the optical receiver module performs an alignment operation by using the first and eighth optical waveguides 351 and 382 of FIG. 2 and the first and fourth optical alignment waveguide 510 and 540. Accordingly, the optical receiver module may be manufactured through simple manufacturing processes.

Figure 4:
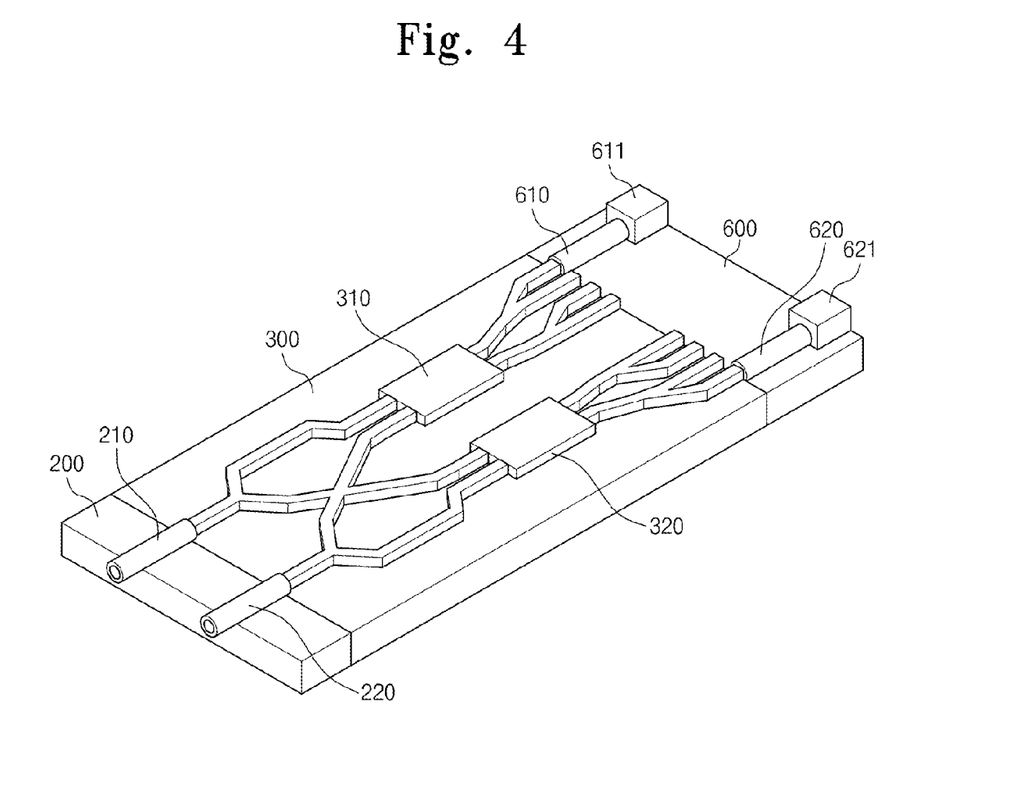
FIGS. 4 to 6 are views illustrating a bonding process of a first substrate and a second substrate according to an embodiment of the present invention.
Figure 5:
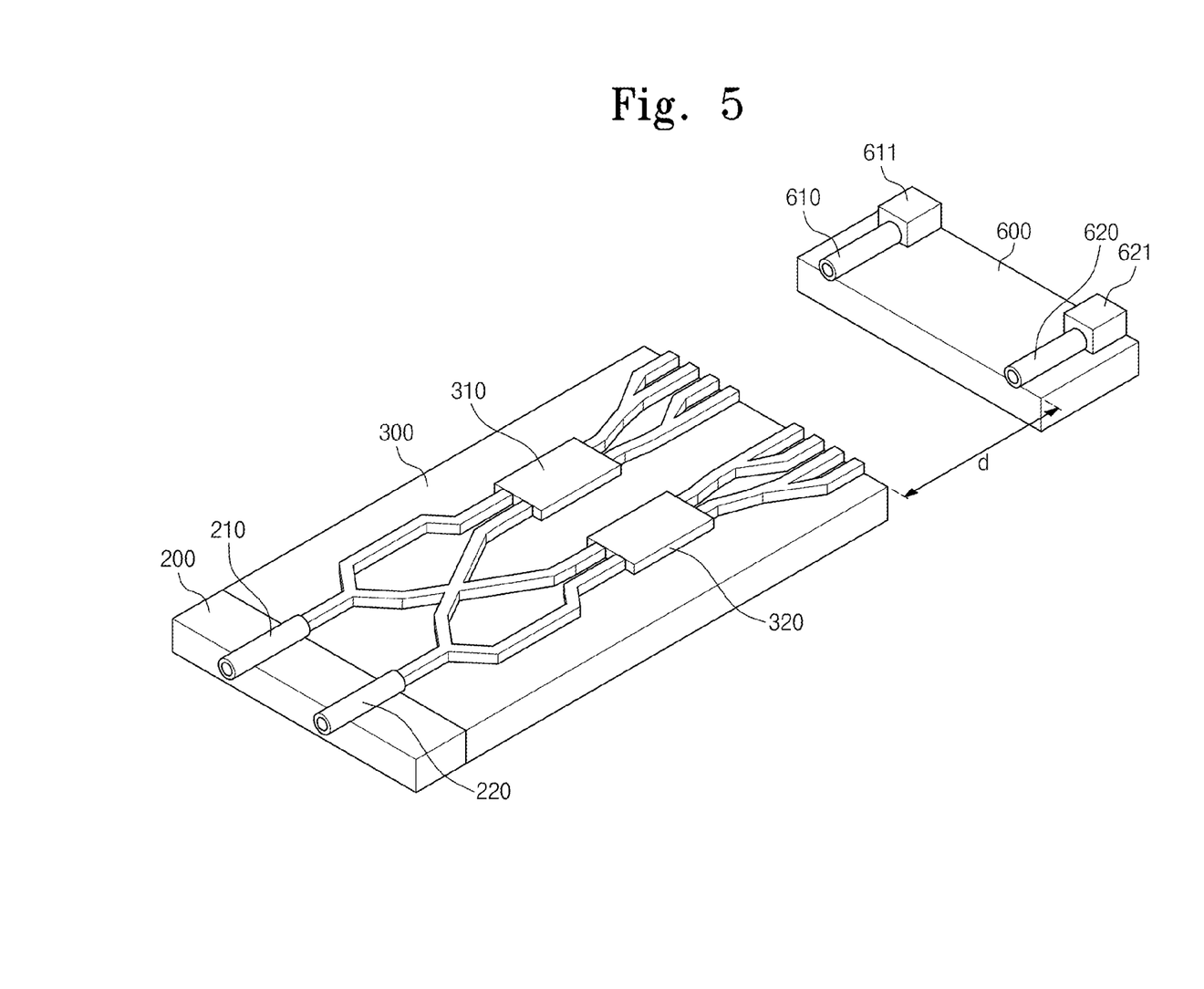
Figure 6:
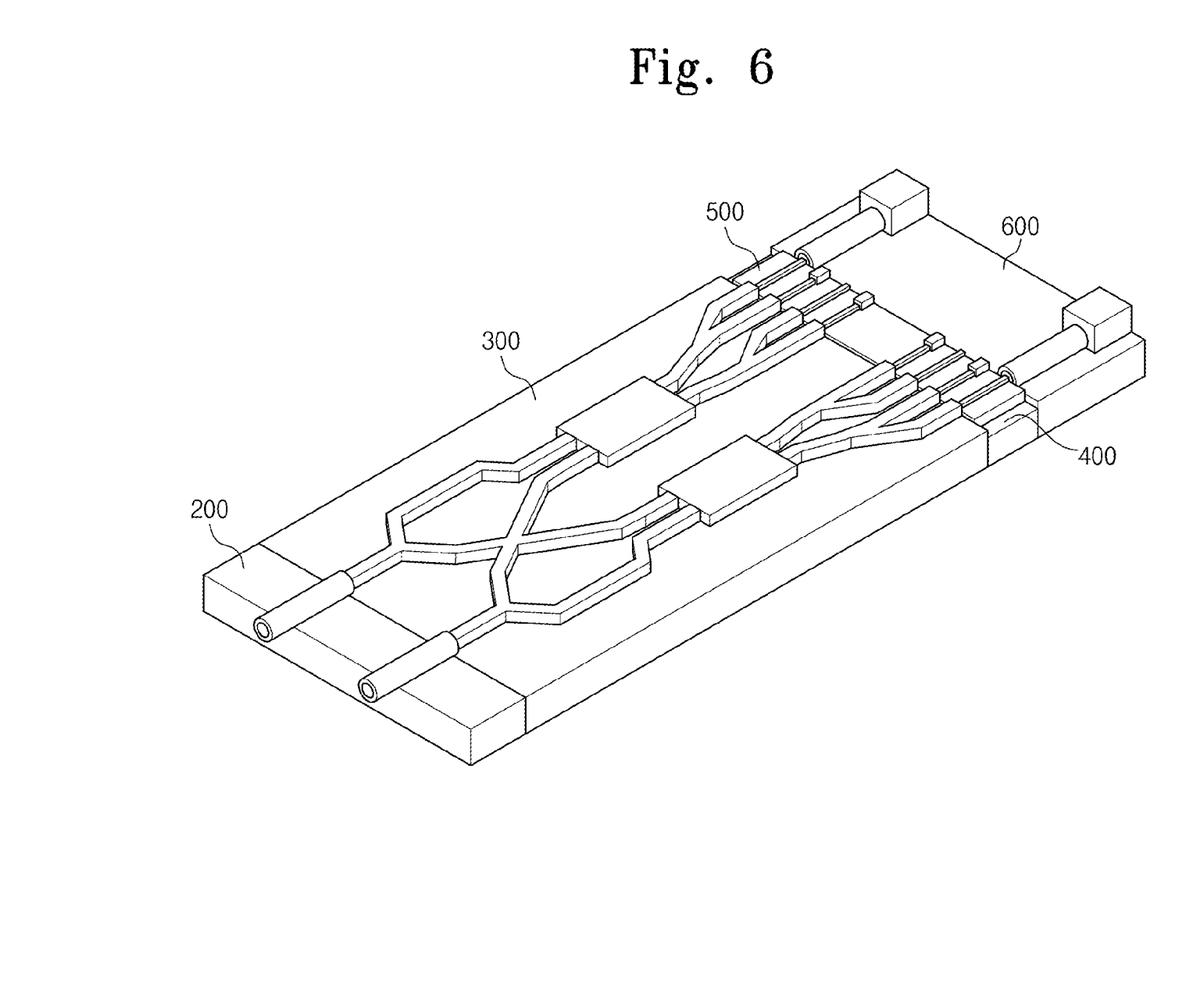

FIGS. 4 to 6 are views illustrating a bonding process of a first substrate and a second substrate according to an embodiment of the present invention. Referring to FIG. 4, a bonding process between the first and second substrates 100 and 400 uses a third substrate 600. The third substrate 600 includes third and fourth optical fibers 610 and 620. Also, a fifth optical detector 611 is connected to the other end of a third optical fiber 710 and a sixth optical detector 621 is connected to the other end of a fourth optical fiber 620.

First, the third substrate 600 is bonded to the first substrate 100. Then, the third optical fiber 610 is connected to the first optical waveguide 351, and the fourth optical fiber 620 is connected to the eighth optical waveguide 382. The optical fiber array 200 delivers an optical signal and a reference optical signal to the first and second MMI optical isolators 310 and 320 through the first and second optical fibers 210 and 220.

Accordingly, the fifth and sixth optical detectors 611 and 621 receive the interfered optical signals from the first and second MMI optical isolators 310 and 320 through the first and eighth optical waveguides 351 and 382. Then, the fifth and sixth optical detectors 611 and 621 measures the intensity of an optical signal received through the first and eighth optical waveguide 351 and 382. Also, an alignment between the first substrate 100 and the third substrate 600 is made in response to the intensity of an optical signal measured through the fifth and sixth optical detectors 611 and 621. Also, when the first substrate 100 and the third substrate 600 are aligned, the third substrate 600 is detached from the first substrate 100 by a predetermined.

Referring to FIG. 5, the first substrate 100 is spaced a predetermined distance d apart from the third substrate 600. Here, the predetermined d refers to a sufficient distance at which the second substrate 400 of FIG. 1 including the optical detector array chip 500 of FIG. 1 is bonded to the first substrate 100.

Referring to FIG. 6, the second substrate 400 is bonded to the first substrate 100, and the third substrate 600 is bonded to the second substrate 400. In more detail, the first to eighth optical waveguides of the plate optical integrated circuit 300 are connected to the first to fourth optical alignment waveguides and the first to fourth optical detection waveguides of the optical detection array 500 in one-to-one correspondence. The first and fourth optical alignment waveguides 510 and 540 are connected to the third and fourth optical fibers 610 and 620 of the third substrate 600, respectively.

Also, the first and second optical fibers 210 and 220 deliver an optical signal and a reference optical signal to the first and second optical waveguides 330 and 340 of FIG. 2. The first and second MMI optical isolators 310 and 320 of FIG. 2 may receive an optical signal and a reference optical signal from the first and second optical waveguides 330 and 340 in order for interference.

The first and eighth optical waveguides 351 and 382 deliver optical signals from the first and second MMI optical isolators 310 and 320 to the first and fourth optical alignment waveguides 510 and 540, respectively. The fifth and sixth optical detectors 611 and 621 are connected to the other ends of the third and fourth optical fibers 610 and 620 connected to the first and fourth optical alignment waveguides 510 and 540, in order to receive optical signal.

The fifth and sixth optical detectors 611 and 612 determine whether the first to third substrates 100, 400, and 600 are aligned by measuring the received optical signal. At this point, the fifth and sixth optical detectors 611 and 621 determine whether the first to third substrates 100, 400, and 600 are aligned on reference with the intensity of an optical signal measured during an alignment process of the first substrate 100 and the third substrate 600. If the first to third substrates 100, 400, and 600 are aligned, the third substrate 600 is detached from the second substrate 400. Also, an adhesive for a final adhesion is used in order to completely bond the first substrate 100 and the second substrate 400.

Similarly, when the first substrate 100 including plate optical integrated circuit chip 300 and the second substrate 400 including the optical detection array 500 are aligned, two optical alignment waveguides are used. Accordingly, the plate optical integrated circuit 300 may not require a process such as etching or polishing, and an optical receiver module may be manufactured through simple processes.

According to embodiments of the present invention, an optical receiver module has a simple structure and is easily manufactured. Additionally, the optical receiver module aligns a plate optical integrated circuit substrate and an optical detector array substrate by using an optical alignment waveguide, so that misalignment between the substrates may be prevented during a bonding process.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An optical receiver module comprising:
   an optical fiber array including a first optical fiber that delivers an optical signal and a second optical fiber that delivers a reference optical signal;
   an optical integrated circuit including first and second multi mode interference (MMI) optical devices respectively receiving the optical signal and the reference optical signal through a plurality of first optical waveguides; and
   an optical detector array receiving two optical signals from each of the first and second MMI optical devices through an end of each of a plurality of second optical waveguides,
   wherein the optical detector array comprises a plurality of third optical waveguides aligned to be connected to another end of each of the plurality of second optical waveguides in one-to-one correspondence,
   wherein one end of each of the plurality of first optical waveguides is connected to the first and second optical fibers and another end of each of the plurality of first optical waveguides is divided into two optical waveguides to be connected to the first and second MMI optical devices, respectively,
   wherein the optical fiber array and the optical integrated circuit are formed on a first substrate, the optical detector array is formed on a second substrate, and the first substrate and the second substrate are formed of a same medium, and wherein the plurality of third optical waveguides comprise a plurality of output waveguides and a plurality of optical alignment waveguides.

2. The optical receiver module of claim 1, wherein the optical fiber array and the optical integrated circuit are disposed on the first substrate, and the optical detector array is disposed on the second substrate.

3. The optical receiver module of claim 1, wherein the optical detector array further comprises a plurality of optical detectors connected to the ends of the plurality of output waveguides, respectively.

4. The optical receiver module of claim 1, wherein each of the first and second MMI optical devices allows the received optical signal and reference signal to interfere with each other.

5. The optical receiver module of claim 4, wherein the two optical signals supplied from the first and second MMI optical devices have a same power, and are outputted through one end of each of the plurality of second optical waveguides.

6. The optical receiver module of claim 5, wherein another end of each of the plurality of second optical waveguides is divided into first and second output terminals, and the first and second output terminals are connected to one output waveguide and one optical alignment waveguide, respectively.

7. The optical receiver module of claim 1, wherein
the plurality of third optical waveguides comprise first and second optical alignment waveguides for aligning the optical integrated circuit and the optical detector array; and
the first and second optical alignment waveguides are respectively disposed at an uppermost and a lowermost of the plurality of third waveguides.

8. The optical receiver module of claim 7, further comprising a third substrate including third and fourth optical fibers connected to the first and second optical alignment waveguides, respectively, wherein optical signals outputted from the third and fourth optical fibers are measured by using first and second optical detectors.

9. The optical receiver module of claim 8, wherein
a section of the second substrate is bonded to a section of the first substrate;
a section of the third substrate is bonded to a section of the second substrate; and
the first to third substrates are aligned by using intensities of the optical signals measured by the first and second optical detectors.

10. The optical receiver module of claim 1, wherein the optical integrated circuit and the optical detector array are formed on a silica or Si substrate.

11. An optical receiver module comprising:
a first optical waveguide part connected to a first optical fiber and divided into first and second optical waveguides;
a second optical waveguide part connected to a second optical fiber and divided into third and fourth optical waveguides;
a first MMI optical device receiving a first optical signal delivered through the first and third optical waveguides and isolating the received first optical signal into two optical signals having a same power through a first optical signal interference;
a second MMI optical device receiving a second optical signal delivered through the second and fourth optical waveguides and isolating the received second optical signal into two optical signals having a same power through a second optical signal interference;
a third optical waveguide part connected to the first MMI optical device and divided into fifth and sixth optical waveguides, each of the fifth and sixth optical waveguides being divided into two optical waveguides;
a fourth optical waveguide part connected to the second MMI optical device and divided into seventh and eighth optical waveguides, each of the seventh and eighth waveguides being divided into two optical waveguides; and
an optical detector array connected to output terminals of the third and fourth optical waveguide parts in one-to-one correspondence,
wherein
the optical detector array comprises a plurality of optical waveguides connected to the output terminals of the third and fourth optical waveguide parts in one-to-one correspondence; and
optical waveguides at an uppermost and a lowermost of the plurality of optical waveguides are used for aligning the optical detector array and the first to fourth optical waveguide parts.

* * * * *